(12) United States Patent
Takeo et al.

(10) Patent No.: US 6,231,246 B1
(45) Date of Patent: May 15, 2001

(54) METHOD AND APPARATUS FOR REPRODUCING AN IMAGE VIA TWO IMAGE REPRODUCING DEVICES WHEREIN GRADATION AND/OR SHARPNESS CORRECTION IS PERFORMED FOR BOTH IMAGE REPRODUCING DEVICES

(75) Inventors: Hideya Takeo; Eiji Ogawa, both of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/783,851

(22) Filed: Jan. 16, 1997

(30) Foreign Application Priority Data

Jan. 17, 1996 (JP) .................................................. 8-005868
Jul. 3, 1996 (JP) .................................................. 8-173780

(51) Int. Cl.$^7$ .......................... G06K 15/02; H04N 1/407; H04N 1/409; G09G 5/00; G09G 5/10
(52) U.S. Cl. .......................... 395/102; 358/1.9; 358/447; 358/455; 358/401; 358/1.2; 345/132; 345/147; 345/1
(58) Field of Search .................................. 358/527, 521, 358/532, 449, 455, 451, 401, 296, 298, 406, 504, 1.2, 1.9; 345/127, 132, 147, 1; 395/109, 102

(56) References Cited

U.S. PATENT DOCUMENTS

| | | | | |
|---|---|---|---|---|
| 4,468,692 | * | 8/1984 | Yamada et al. | 358/527 |
| 4,769,696 | * | 9/1988 | Utsuda et al. | 358/527 |
| 4,794,460 | * | 12/1988 | Shiota | 386/128 |
| 4,956,703 | * | 9/1990 | Uzuda et al. | 358/527 |

* cited by examiner

Primary Examiner—Scott Rogers
(74) Attorney, Agent, or Firm—Sughrue, Mion, Zinn, Macpeak & Seas, PLLC (57) ABSTRACT

First reproduced image processing conditions for an image signal are prepared, which yield a visible image having a desired level of gradation and/or sharpness with a first image reproducing device, and the corresponding second reproduced image processing conditions are prepared, which yield a visible image having a desired level of gradation and/or sharpness with a second image reproducing device. In cases where the visible image is reproduced by the first image reproducing device and in accordance with the first reproduced image processing conditions, image processing is carried out on the image signal and under the second reproduced image processing conditions, which correspond to the first reproduced image processing conditions. A visible image is reproduced by the second image reproducing device and from the processed image signal, which has been obtained from the image processing carried out under the second reproduced image processing conditions corresponding to the first reproduced image processing conditions.

20 Claims, 5 Drawing Sheets

FIG. 4A good    bad

FIG. 4B bad    good

FIG. 4C good    good

METHOD AND APPARATUS FOR REPRODUCING AN IMAGE VIA TWO IMAGE REPRODUCING DEVICES WHEREIN GRADATION AND/OR SHARPNESS CORRECTION IS PERFORMED FOR BOTH IMAGE REPRODUCING DEVICES

BACKGROUND OF THE INVENTION

1. Field of the Invention

This invention relates to an image reproducing method and apparatus for reproducing a visible image with a first image reproducing means and reproducing a visible image with a second image reproducing means, which is of the same kind as the first image reproducing means or of a kind different from the first image reproducing means.

2. Description of the Prior Art

Heretofore, in cases where an image is displayed on an image displaying means, such as a CRT display device or a liquid crystal displaying device, a gradation converting table for converting the gradation characteristics of the image displaying means (i.e., the relationship between the image signal value and the logarithmic value of the luminance, or the like, on the image displaying means) into linear characteristics is prepared. Image processing is then carried out on the image signal and in accordance with the gradation converting table. A visible image, which is represented by the image signal having been obtained from the image processing, is displayed on the image displaying means. Also, in a system for displaying a radiation image, or the like, a visible image is firstly reproduced from an image signal representing an image and is displayed on an image displaying means. The visible image displayed on the image displaying means is viewed, and ultimate image processing conditions, under which the image signal is to be processed, are thereby adjusted. Image processing is then carried out on the image signal and under the adjusted image processing conditions, and a visible image is reproduced from the processed image signal and recorded on a recording material, such as film, with a recording means, such as a laser printer.

However, the gradation on the image displaying means and the gradation on the recording means do not perfectly coincide with each other. Also, the capacity of expressing an image is substantially different between the image displaying means and the recording material. Therefore, even if the image processing conditions appropriate for the image displayed on the image displaying means are adjusted, the adjusted image processing conditions will not necessarily be appropriate for the image, which is to be recorded on the recording material. In such cases, if the image is recorded on the recording material by being processed under the image processing conditions, which have been adjusted for the image displayed on the image displaying means, the problems will occur in that a desired level of gradation cannot be obtained, and in that the image recorded on the recording material becomes difficult to view.

It is also considered that the same problems as those with regard to the difference in gradation will occur also for the image sharpness expressed on the image displaying means and the image sharpness expressed on the recording material with the recording means.

Specifically, in cases where there is a difference in resolving power between the image displaying means and the recording means, a difference in sharpness in proportion to the difference in resolving power occurs between the image reproduced by the image displaying means and the recording means. Therefore, also for the image sharpness, the image processing conditions appropriate for the image, which is displayed on the image displaying means, and the image processing conditions appropriate for the image, which is to be recorded on the recording material by the recording means, do not necessarily coincide with each other.

The problems described above occur between the two different kinds of image reproducing means, i.e., between the image displaying means and the recording means. The same problems also occur between two image reproducing means, which are of the same kind. Specifically, in cases where the two image reproducing means are the image displaying means, such as the CRT display devices, it often occurs that the number of the scanning lines is different between the two image displaying means. It also occurs that one of the two image displaying means is a new one, and the other is the one, in which the light emission efficiency of the fluorescent screen has deteriorated with the passage of time or in which a change has occurred in the beam spot of the electron beam. In such cases, even if visible images are reproduced from the processed image signals, which have been obtained by carrying out the image processing under the same image processing conditions, visible images having the same level of gradation and the same level of sharpness cannot be reproduced on the two image displaying means.

Further, in cases where the two image reproducing means are the image recording means, such as laser printers, the problems will often occur in that a difference in image quality of the image, which can be expressed, occurs due to a difference in the number of scanning lines between the two image recording means, or the like.

SUMMARY OF THE INVENTION

The primary object of the present invention is to provide an image reproducing method, wherein image processing appropriate for a first image reproducing means and image processing appropriate for a second image reproducing means are carried out, and visible images, which have good image quality and are easy to view, are thereby reproduced on the first image reproducing means and the second image reproducing means.

Another object of the present invention is to provide an apparatus for carrying out the image reproducing method.

The present invention provides an image reproducing method, wherein predetermined image processing is carried out on an image signal representing an image of an object, a visible image is reproduced by a first image reproducing means and from a processed image signal, which has been obtained from the image processing carried out on the image signal, and a visible image is reproduced by a second image reproducing means and from a processed image signal, which has been obtained from image processing carried out on the image signal, the second image reproducing means having gradation characteristics in image reproduction, which are different from the gradation characteristics in image reproduction of the first image reproducing means, and/or sharpness characteristics in image reproduction, which are different from the sharpness characteristics in image reproduction of the first image reproducing means, the method comprising the steps of:

i) preparing first reproduced image processing conditions, which yield a visible image having a desired level of gradation and/or a desired level of sharpness when the visible image is reproduced by the first image reproducing means, and the corresponding second reproduced image processing conditions, which yield a visible image having a desired level of gradation and/or a desired level of sharpness when the visible image is reproduced by the second image reproducing means, ii) in cases where the visible image is reproduced by the first image reproducing means and in accordance with the first reproduced image processing conditions, carrying out image processing on the image signal and under the second reproduced image processing conditions, which correspond to the first reproduced image processing conditions, a processed image signal being thereby obtained, and iii) reproducing a visible image by the second image reproducing means and from the processed image signal, which has been obtained from the image processing carried out under the second reproduced image processing conditions corresponding to the first reproduced image processing conditions.

In the image reproducing method in accordance with the present invention, the first image reproducing means may be constituted of means selected from the group consisting of an image displaying means for displaying the visible image and an image recording means for recording the visible image on a recording material. Also, the second image reproducing means may be constituted of means selected from the group consisting of an image displaying means for displaying the visible image and an image recording means for recording the visible image on a recording material. Specifically, by way of example, both of the first image reproducing means and the second image reproducing means may be constituted of the image displaying means. Alternatively, both of the first image reproducing means and the second image reproducing means may be constituted of the image recording mean. As another alternative, one of the first image reproducing means and the second image reproducing means may be constituted of the image displaying means, and the other may be constituted of the image recording means.

Examples of the image displaying means include a light emission displaying means, such as a CRT display device, and various other displaying means, such as a liquid crystal display device. Examples of the image recording means include various types of recording means, such as a laser printer. Also, examples of the recording materials include various types of recording materials, such as photosensitive materials, e.g. film.

Further, in the image reproducing method in accordance with the present invention, the first reproduced image processing conditions and the corresponding second reproduced image processing conditions should preferably be prepared in accordance with a portion of the object, the pattern of which is embedded in the image. The foregoing also applies to an image reproducing apparatus in accordance with the present invention, which will be described below.

The present invention also provides an image reproducing apparatus, comprising:

i) an image processing means for carrying out predetermined image processing on an image signal representing an image of an object, ii) a first image reproducing means for reproducing a visible image from a processed image signal, which has been obtained from the image processing carried out on the image signal, and iii) a second image reproducing means for reproducing a visible image from a processed image signal, which has been obtained from image processing carried out on the image signal, the second image reproducing means having gradation characteristics in image reproduction, which are different from the gradation characteristics in image reproduction of the first image reproducing means, and/or sharpness characteristics in image reproduction, which are different from the sharpness characteristics in image reproduction of the first image reproducing means, wherein the apparatus further comprises a storage means for storing information representing first reproduced image processing conditions, which yield a visible image having a desired level of gradation and/or a desired level of sharpness when the visible image is reproduced by the first image reproducing means, and information representing the corresponding second reproduced image processing conditions, which yield a visible image having a desired level of gradation and/or a desired level of sharpness when the visible image is reproduced by the second image reproducing means, and wherein, in cases where the visible image is reproduced by the first image reproducing means and in accordance with the first reproduced image processing conditions, the image processing means reads the information representing the second reproduced image processing conditions, which correspond to the first reproduced image processing conditions, from the storage means, and the image processing means carries out image processing on the image signal and under the second reproduced image processing conditions, which have thus been read from the storage means.

With the image reproducing method and apparatus in accordance with the present invention, the first reproduced image processing conditions, which are appropriate for the reproduction of the visible image with the first image reproducing means, and the corresponding second reproduced image processing conditions, which are appropriate for the reproduction of the visible image with the second image reproducing means, are prepared. The visible image is reproduced by the first image reproducing means and from the processed image signal, which has been obtained from the image processing carried out under the appropriate first reproduced image processing conditions. Also, the image processing is carried out on the image signal and under the second reproduced image processing conditions, which correspond to the appropriate first reproduced image processing conditions. A visible image is then reproduced by the second image reproducing means and from the processed image signal, which has been obtained from the image processing carried out under the second reproduced image processing conditions corresponding to the appropriate first reproduced image processing conditions. Therefore, with each of the two image reproducing means, the visible image is reproduced from the processed image signal, which has been obtained from the appropriate image processing. Accordingly, the visible images, which have good image quality and are easy to view, can be obtained with the two image reproducing means.

Also, even if the first reproduced image processing conditions and the corresponding second reproduced image processing conditions are prepared, the correspondence relationship between them will not necessarily obtain for a different portion of the object, the pattern of which is embedded in the image. For example, it may occur that the first reproduced image processing conditions appropriate for reproducing an image, in which the pattern of an object portion having a comparatively high image density is embedded, as an appropriate visible image by the first image reproducing means and the first reproduced image processing conditions appropriate for reproducing an image, in which the pattern of an object portion having a comparatively low image density is embedded, as an appropriate visible image by the first image reproducing means are identical with each other. However, in such cases, the two sets of the second reproduced image processing conditions appropriate for reproducing the two images (i.e., the image, in which the pattern of the object portion having a comparatively high image density is embedded, and image, in which the pattern of the object portion having a comparatively low image density is embedded) as the visible images by the second image reproducing means are not necessarily identical with each other. Thus the two sets of the second reproduced image processing conditions, which are respectively appropriate for reproducing the two images, are often different from each other. Therefore, with the image reproducing method and apparatus in accordance with the present invention, wherein the first reproduced image processing conditions and the corresponding second reproduced image processing conditions are prepared in accordance with the portion of an object, the pattern of which is embedded in the image, appropriate image processing can be carried out on the image signal in accordance with the portion of the object, the pattern of which is embedded in the image, and the appropriately processed visible image can be reproduced by each of the first image reproducing means and the second image reproducing means.

DESCRIPTION OF THE PREFERRED EMBODIMENTS

The present invention will hereinbelow be described in further detail with reference to the accompanying drawings.

Figure 1:
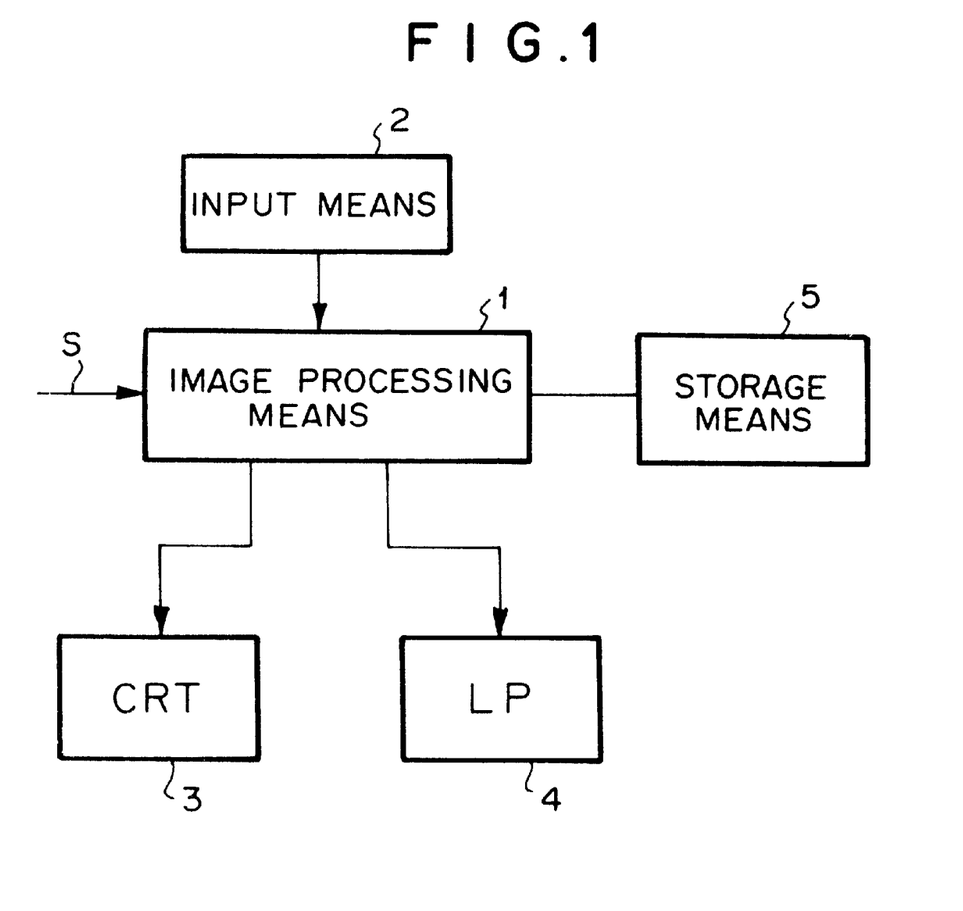
FIG. 1 is a block diagram showing an embodiment of the image reproducing apparatus in accordance with the present invention.

FIG. 1 is a block diagram showing an embodiment of the image reproducing apparatus in accordance with the present invention. The image reproducing apparatus illustrated in FIG. 1 is the apparatus for reproducing medical images. The image reproducing apparatus comprises an image processing means 1 for carrying image processing on an image signal S representing an image of an object, and an input means 2, which may be constituted of a keyboard, or the like. From the input means 2, information representing image processing conditions, under which the image processing is carried out on the image signal S in the image processing means 1, is inputted. The image reproducing apparatus also comprises a CRT display device 3 serving as a light emission displaying means, which is employed as an example of a first image reproducing means for reproducing a visible image from the image signal S having been obtained from the image processing carried out in the image processing means 1. The image reproducing apparatus further comprises a laser printer (hereinbelow referred to as the LP) 4 for recording a visible image on film. The LP 4 serves as an image recording means, which is employed as an example of a second image reproducing means for reproducing a visible image from the image signal S having been obtained from the image processing carried out in the image processing means 1. The image reproducing apparatus still further comprises a storage means 5 for storing the correspondence relationship between displayed image processing conditions and recorded image processing conditions. The displayed image processing conditions serve as first reproduced image processing conditions, under which the image signal S is processed when the visible image is to be displayed on the CRT display device 3. The recorded image processing conditions serve as second reproduced image processing conditions, under which the image signal S is processed when the visible image is to be recorded on the film by the LP 4.

In accordance with the displayed image processing conditions received from the input means 2, the image processing means 1 reads the information representing the recorded image processing conditions, which correspond to the displayed image processing conditions, from the storage means 5. The image processing means 1 carries out the image processing on the image signal S and under the displayed image processing conditions and feeds a processed image signal, which has been obtained from the image processing, into the CRT display device 3. Also, the image processing means 1 carries out the image processing on the image signal S and under the recorded image processing conditions and feeds a processed image signal, which has been obtained from the image processing, into the LP 4. The storage means 5 stores the displayed image processing conditions and the corresponding recorded image processing conditions in accordance with the portion of the object, the pattern of which is embedded in the image.

How the image reproducing apparatus operates will be described hereinbelow.

Firstly, how the displayed image processing conditions and the corresponding recorded image processing conditions are prepared will be described hereinbelow.

Figure 2:
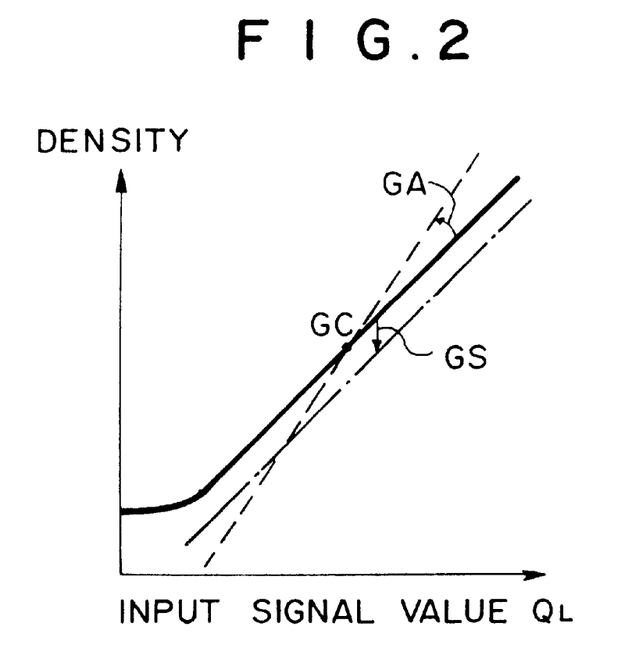
FIG. 2 is a graph showing gradation characteristics of film.
Figure 3:
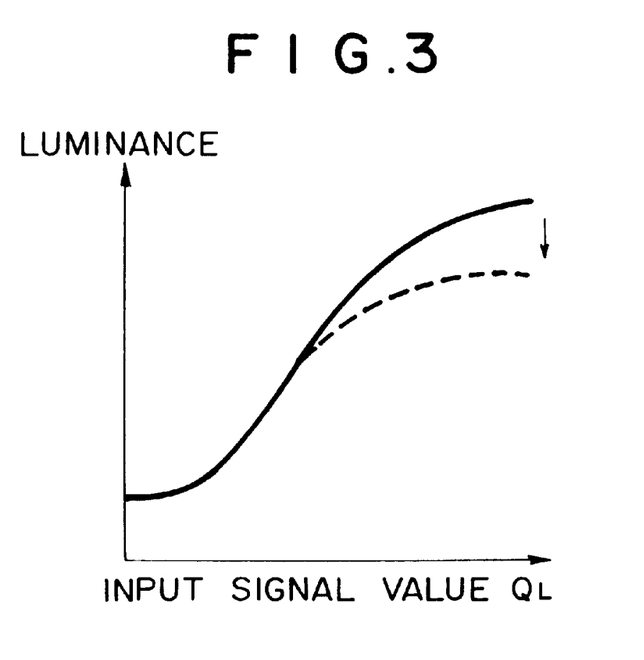
FIG. 3 is a graph showing gradation characteristics of a CRT display device.

FIG. 2 is a graph showing fundamental gradation characteristics of film. FIG. 3 is a graph showing fundamental gradation characteristics of a CRT display device. The dynamic range of the CRT display device 3 under external light is narrower than the dynamic range of the film under external light. As illustrated in FIG. 3, as the intensity of the external light becomes high, the gradient at a high image density portion (i.e., a low luminance portion) of the image becomes small. Therefore, in cases where the region, which is to be used, in the image is located at a high image density portion (as in, for example, a mamma image), if the gradient on the CRT display device 3 is adjusted to be large, the high image density portion cannot be viewed accurately.

Also, if the image is recorded on the film and with the same level of gradation as that on the CRT display device 3, the level of contrast will become very high. Therefore, in this embodiment, in cases where the region, which is to be used, in the image is located at a high image density portion, the displayed image processing conditions and the corresponding recorded image processing conditions are prepared as listed in Table 1 shown below and are stored in the storage means 5.

TABLE 1

|  | Film | CRT display device |
|---|---|---|
| GA | 1.0 | 1.2 |
| GT | A | A |
| GC | 1.2 | 1.2 |
| GS | 0.0 | −0.5 |

In Table 1, GA represents the gradation emphasis degree, i.e. the gradient, and GT represents the type of the gradation curve. In this embodiment, type A represents the linear gradation curve. Also, GC represents the center of rotation in the process for changing the gradient, and GS represents the amount of shift of the gradation curve.

As listed in Table 1, in the displayed image processing conditions for the CRT display device 3, GS is set to be negative value. Specifically, in cases where GA is merely set to be large, the value at the high image density portion will become very large, and the visible image displayed on the CRT display device 3 will become difficult to view. In order for such problems to be eliminated, GS is set to be a negative value.

Figure 4A:
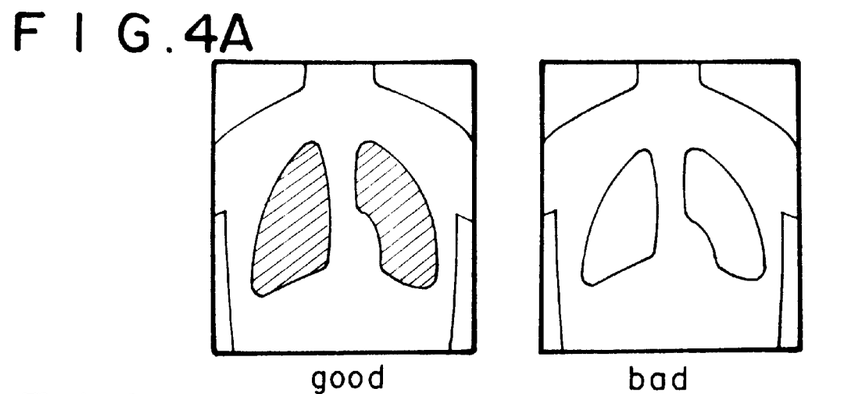
FIGS. 4A, 4B, and 4C are explanatory views showing how the displayed image processing conditions and the corresponding recorded image processing conditions are prepared.
Figure 4B:
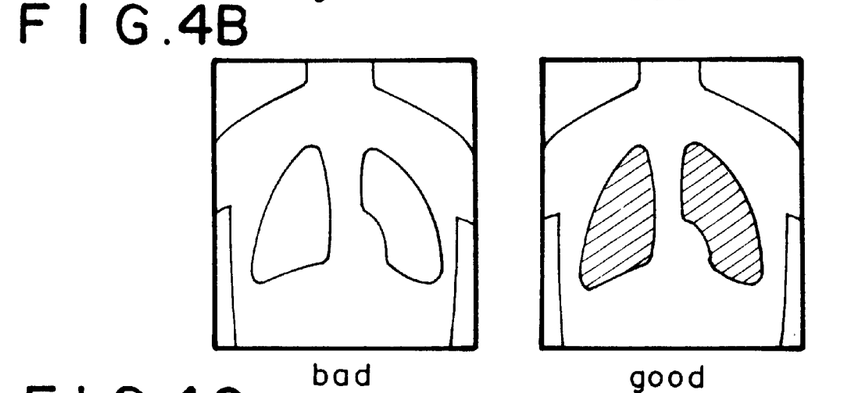

FIGS. 4A, 4B, and 4C are explanatory views showing how the displayed image processing conditions and the corresponding recorded image processing conditions are prepared. Firstly, as illustrated in FIG. 4A, the image processing is carried out on the image signal S and under (good) image processing conditions, which are appropriate for displaying the visible image on the CRT display device 3. The visible image is reproduced from the image signal S having been obtained from the image processing and is displayed on the CRT display device 3. The image processing conditions are inappropriate (bad) for recording the visible image on the film. Therefore, as illustrated in FIG. 4B, the image processing is carried out on the image signal S and under (good) image processing conditions, which are appropriate for recording the visible image on the film. The visible image is reproduced from the image signal S having been obtained from the image processing and is recorded on the film by the LP 4.

Figure 4C:
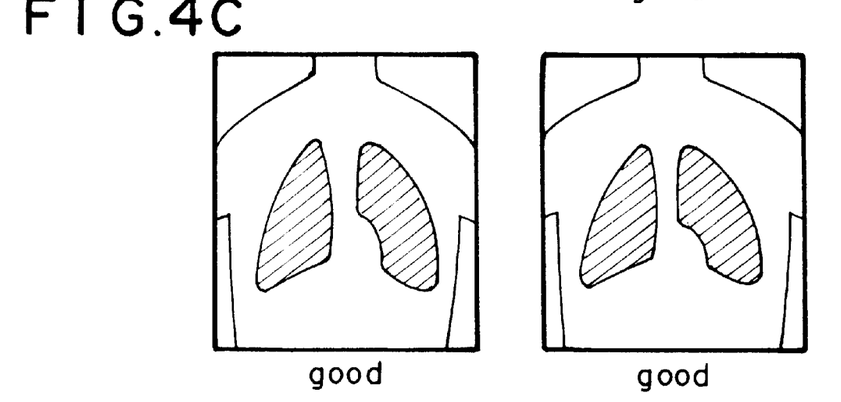

The image processing conditions, which are thus employed for recording the visible image on the film, are inappropriate (bad) for displaying the visible image on the CRT display device 3. Thereafter, as illustrated in FIG. 4C, information representing the correspondence relationship between the image processing conditions (i.e., the displayed image processing conditions), which are appropriate for displaying the visible image on the CRT display device 3, and the image processing conditions (i.e., the recorded image processing conditions), which are appropriate for recording the visible image on the film, is stored in the storage means 5. When the information representing the displayed image processing conditions is inputted from the input means 2, the information representing the recorded image processing conditions, which correspond to the inputted displayed image processing conditions, is read from the storage means 5.

In the manner described above, the information representing the displayed image processing conditions and the information representing the corresponding recorded image processing conditions are stored in the storage means 5. When the visible image is to be reproduced from the image signal S and displayed on the CRT display device 3, the information representing the displayed image processing conditions, which are listed in Table 1, is inputted from the input means 2, and the image processing is carried out by the image processing means 1 on the image signal S and under the displayed image processing conditions. The visible image is then reproduced from the image signal S having been obtained from the image processing and is displayed on the CRT display device 3. Also, the image processing means 1 makes reference to the information having been stored in the storage means 5 and reads the information representing the recorded image processing conditions, which are listed in Table 1, from the storage means 5 and in accordance with the displayed image processing conditions having been inputted from the input means 2. When the visible image is to be reproduced from the image signal S and recorded on the film by the LP 4, the image processing means 1 carries out the image processing on the image signal S and under the recorded image processing conditions, which have thus been read from the storage means 5.

As described above, in this embodiment, the displayed image processing conditions, which are appropriate for displaying the visible image on the CRT display device 3, and the corresponding recorded image processing conditions, which are appropriate for recording the visible image on the film, are prepared and stored in the storage means 5. The visible image is reproduced from the processed image signal S having been obtained from the image processing carried out under the appropriate displayed image processing conditions and is displayed on the CRT display device 3. Also, the image processing is carried out on the image signal S and under the recorded image processing conditions, which correspond to the appropriate displayed image processing conditions. The visible image is then reproduced from the processed image signal having been obtained from the image processing carried out under the recorded image processing conditions corresponding to the appropriate displayed image processing conditions and is recorded on the film. Therefore, with each of the CRT display device 3 and the LP 4, the visible image is reproduced from the processed image signal, which has been obtained from the appropriate image processing. Accordingly, the visible images, which have good image quality and are easy to view, can be obtained with the CRT display device 3 and the LP 4.

In the embodiment described above, the region, which is to be used, in the image is located at the high image density portion (as in, for example, the mamma image). In cases where the region, which is to be used, in the image is located at a medium image density portion (as in, for example, the chest image), the displayed image processing conditions for displaying the visible image, which is represented by the image signal S, on the CRT display device 3 and the recorded image processing conditions for recording the visible image on the film are set as listed in Table 2 shown below.

TABLE 2

|    | Film | CRT display device |
|----|------|--------------------|
| GA | 1.0  | 1.1                |
| GT | A    | A                  |
| GC | 1.2  | 1.2                |
| GS | 0.0  | 0.0                |

Figure 5A:
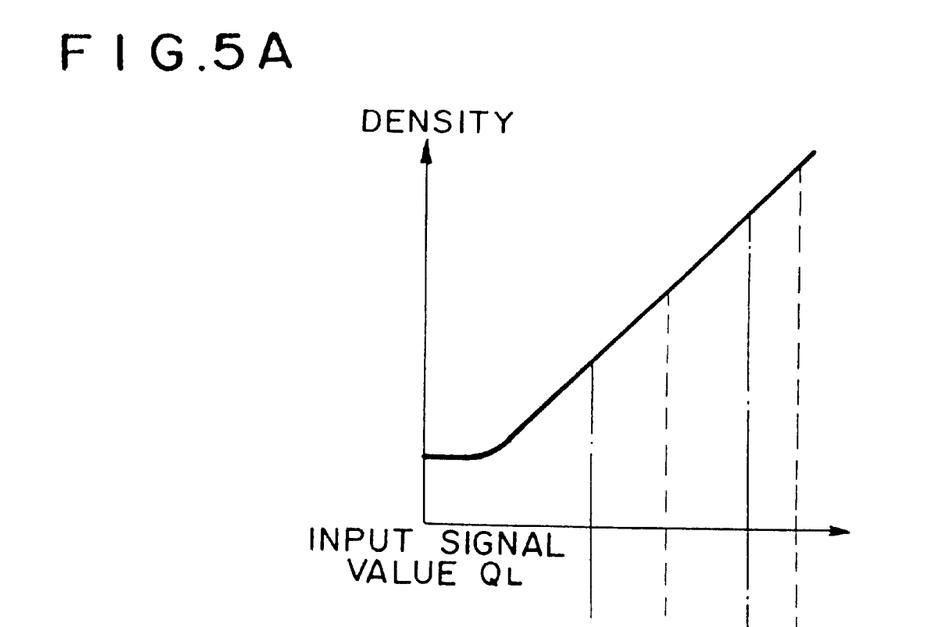
FIG. 5 shows graphs showing gradation characteristics of film (A) and a CRT display device (B), in which depletion in luminance has occurred.
Figure 5B:
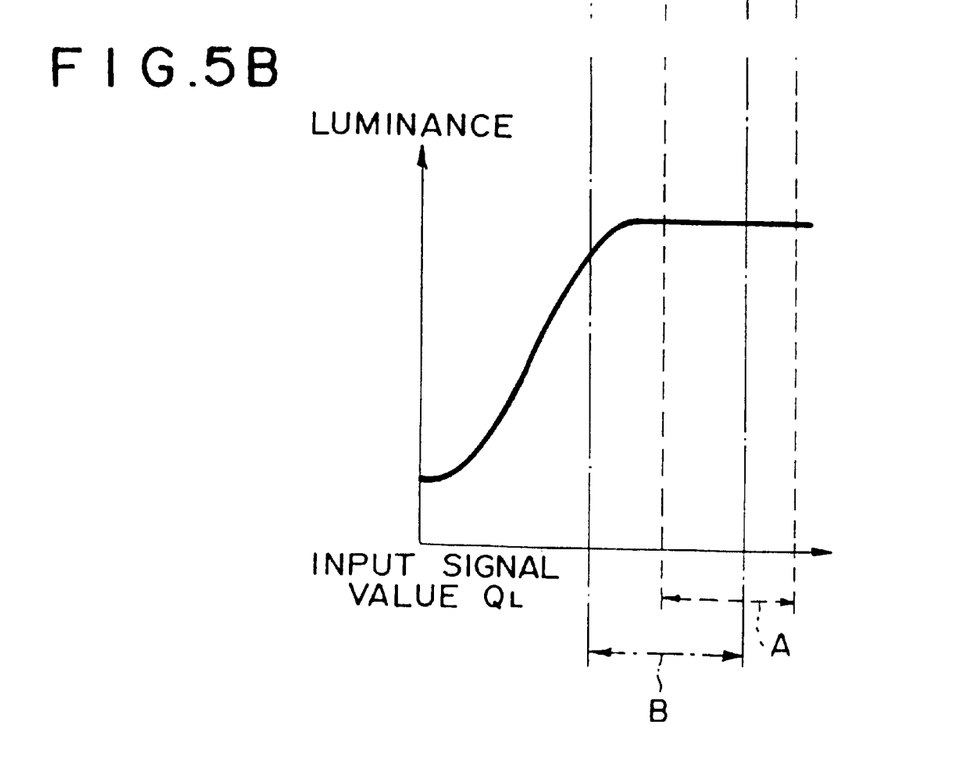

It often occurs that the luminance of the light emission displaying means (serving as the image displaying means), such as the CRT display device 3, is depleted due to deterioration of the display surface of the light emission displaying means (for example, the tube surface of the CRT display device 3) or deterioration of an electron gun used for carrying out light emission display. FIG. 5(A) shows the gradation characteristics of the film. FIG. 5(B) shows the luminance characteristics representing the relationship between the image signal and the luminance of the light emission displaying means. As illustrated in FIG. 5(B), in cases where the luminance of the light emission displaying means is depleted, even if the same level of voltage is applied to the light emission displaying means, the same level of luminance as the original level of luminance cannot be obtained. If the luminance of the light emission displaying means is thus depleted, details of a high image density portion (i.e., a low luminance portion) A will become imperceptible, and the gradient in the region from a low image density portion to a medium image density portion B will become large. If the luminance is thus depleted, the contrast of the high image density portion A cannot be reproduced, and the problems will occur in that the image information at the high image density portion A is lost, and in that the feeling of the image becomes different from the correct feeling.

Therefore, in such cases, such that the image information at the high image density portion A shown in FIG. 5(B) may not be lost, the displayed image processing conditions and the corresponding recorded image processing conditions should preferably be set as listed in Table 3 shown below.

TABLE 3

|    | Film | CRT display device |
|----|------|--------------------|
| GA | 1.0  | 0.7                |
| GT | A    | A                  |
| GC | 1.2  | 1.2                |
| GS | 0.0  | -0.5               |

As listed in Table 3, in the displayed image processing conditions, GA is set to be small, and GS is set to be a negative value. In cases where the displayed image processing conditions are set in this manner, the visible image can be displayed accurately on the CRT display device 3 such that the details of the high image density portion A may not become imperceptible, and such that the level of contrast may not become very high.

In cases where the image information at the medium image density portion B shown in FIG. 5(B) should be prevented from being lost, the displayed image processing conditions and the corresponding recorded image processing conditions should preferably be set as listed in Table 4 shown below.

TABLE 4

|    | Film | CRT display device |
|----|------|--------------------|
| GA | 1.0  | 0.7                |
| GT | A    | A                  |
| GC | 1.2  | 1.2                |
| GS | 0.0  | -0.2               |

As listed in Table 4, in the displayed image processing conditions, GA is set to be small, and GS is set to be a negative value. In cases where the displayed image processing conditions are set in this manner, the visible image can be displayed accurately on the CRT display device 3 such that the details of the medium image density portion B may not become imperceptible, and such that the level of contrast may not become very high.

In the embodiment described above, the conditions for changing the gradation characteristics of the visible image displayed on the CRT display device 3 are employed as the first reproduced image processing conditions, and the conditions for changing the gradation characteristics of the visible image recorded on the film by the LP 4 are employed as the second reproduced image processing conditions. However, in the image reproducing method and apparatus in accordance with the present invention, the first reproduced image processing conditions and the second reproduced image processing conditions are not limited to the conditions for changing the gradation characteristics described above. In lieu of the conditions for changing the gradation characteristics, conditions for changing the sharpness (frequency characteristics) of the reproduced visible image may be employed as the first reproduced image processing conditions and the second reproduced image processing conditions. As another alternative, combinations of the conditions for changing the gradation characteristics and the conditions for changing the sharpness may be employed simultaneously as the first reproduced image processing conditions and the second reproduced image processing conditions.

As the conditions for changing the sharpness, it is possible to employ, for example, RN serving as the condition for determining the size of an unsharp mask for the original image, RT representing the type of the table which represents an emphasis curve or an emphasis straight line, RE for changing the emphasis degree, or a combination of two or more of them. As for the sharpness of the image, there is no fundamental difference in expression between the CRT display device 3 and the film as in the cases of the aforesaid gradation. The difference in the sharpness between the CRT display device 3 and the film depends upon the difference in resolution between them. Therefore, ordinarily, of the aforesaid conditions RN, RT, and RE for changing the sharpness, the conditions RN and RT need not be changed for each image reproducing means, and only the emphasis degree RE may be changed.

For example, as for a mamma image, the displayed image processing conditions and the corresponding recorded image processing conditions may be set as listed in Table 5 shown below, and the information representing them is stored in the storage means 5. In such cases, a visible image having an appropriate sharpness is recorded on the film by the LP 4. Also, the information representing the displayed image processing conditions for displaying a visible image having an appropriate sharpness on the CRT display device 3, which conditions correspond to the recorded image processing conditions for recording the visible image having the appropriate sharpness on the film, is read from the storage means 5. The image processing is then carried out by the image processing means 1 and under the displayed image processing conditions, and the processed image signal having been obtained from the image processing is fed into the CRT display device 3. In this manner, the visible image having the appropriate sharpness can be displayed on the CRT display device 3.

TABLE 5

|    | Film | CRT display device |
|----|------|--------------------|
| RN | 5    | 5                  |
| RT | P    | P                  |
| RE | 1.0  | 1.1                |

Also, as listed in Table 6 shown below, a combination of the conditions (GA, GT, GC, and GS) for changing the gradation characteristics and the conditions (RN, RT, and RE) for changing the sharpness and the corresponding combination of such conditions may be set simultaneously as the recorded image processing conditions and the displayed image processing conditions. The information representing the combinations of the conditions may be stored in the storage means 5. In this manner, the conditions for changing the gradation characteristics and the conditions for changing the sharpness may be set simultaneously.

TABLE 6

|    | Film | CRT display device |
|----|------|--------------------|
| GA | 1.2  | 1.32               |
| GT | G    | G                  |
| GC | 0.6  | 0.6                |
| GS | 0.3  | 0.3                |
| RN | 5    | 5                  |
| RT | P    | P                  |
| RE | 1.0  | 1.1                |

In the image reproducing method and apparatus in accordance with the present invention, the displayed image processing conditions for displaying the appropriate visible image on the CRT display device 3 may be determined firstly, and thereafter the recorded image processing conditions for recording the appropriate visible image on the film by the LP 4, which conditions correspond to the displayed image processing conditions having been determined, may be determined. Alternatively, the recorded image processing conditions for recording the appropriate visible image on the film by the LP 4 may be determined firstly, and thereafter the displayed image processing conditions for displaying the appropriate visible image on the CRT display device 3, which conditions correspond to the recorded image processing conditions having been determined, may be determined.

Figure 6A:
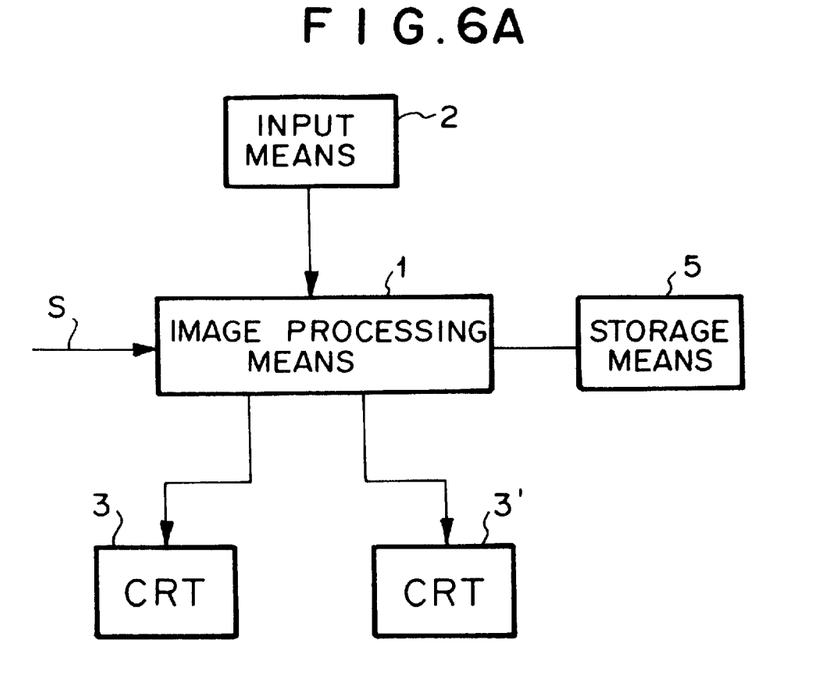
FIG. 6A is a block diagram showing an embodiment of the image reproducing apparatus in accordance with the present invention, wherein two image reproducing means are constituted of image displaying means (CRT display devices)

In the embodiments described above, the CRT display device 3 is employed as the first image reproducing means, and the LP 4 is employed as the second image reproducing means. However, the image reproducing method and apparatus in accordance with the present invention are not limited to the image reproduction with the two different kinds of image reproducing means. For example, as illustrated in FIG. 6A, the CRT display device 3 may be employed as an example of the first image reproducing means, and a CRT display device 3' may be employed as an example of the second image reproducing means.

Specifically, visible images may be reproduced from a single image and displayed with an appropriate level of gradation and/or an appropriate level of sharpness on the two CRT display devices 3 and 3'. In such cases, it often occurs that the number of the scanning lines is different between the two CRT display devices 3 and 3'. It also occurs that one of the two CRT display devices 3 and 3' is a new one, and the other is the one, in which the light emission efficiency of the fluorescent screen has deteriorated with the passage of time or in which a change has occurred in the beam spot of the electron beam. In such cases, even if the visible images are reproduced from the processed image signals, which have been obtained by carrying out the image processing under the same displayed image processing conditions, and the visible images are displayed on the two CRT display devices 3 and 3', visible images having the same level of gradation and the same level of sharpness cannot necessarily be displayed on the two CRT display devices 3 and 3'.

In such cases, as listed in Table 7 shown below, the first displayed image processing conditions, which yield a visible image having a desired level of gradation and/or a desired level of sharpness on the CRT display device 3, and the corresponding second displayed image processing conditions, which yield a visible image having a desired level of gradation and/or a desired level of sharpness on the CRT display device 3', may be set, and the information representing the conditions may be stored in the storage means 5. In such cases, the visible image having an appropriate level of gradation and/or an appropriate level of sharpness is reproduced on the CRT display device 3 and from the processed image signal, which has been obtained from the image processing carried out by the image processing means 1 under the first displayed image processing conditions. At this time, the image processing means 1 reads the information representing the second displayed image processing conditions, which correspond to the first displayed image processing conditions, from the storage means 5. The image processing means 1 carries out the image processing on the aforesaid image signal and under the second displayed image processing conditions. The visible image having an appropriate level of gradation and/or an appropriate level of sharpness is reproduced from the processed image signal having been obtained from the image processing carried out under the second displayed image processing conditions and is displayed on the CRT display device 3'.

TABLE 7

|    | CRT display device 3 | CRT display device 3' |
|----|----------------------|-----------------------|
| GA | 1.0                  | 0.7                   |
| GT | A                    | A                     |
| GC | 1.2                  | 1.2                   |
| GS | 0.0                  | -0.5                  |
| RN | 5                    | 5                     |
| RT | P                    | P                     |
| RE | 1.0                  | 1.1                   |

Figure 6B:
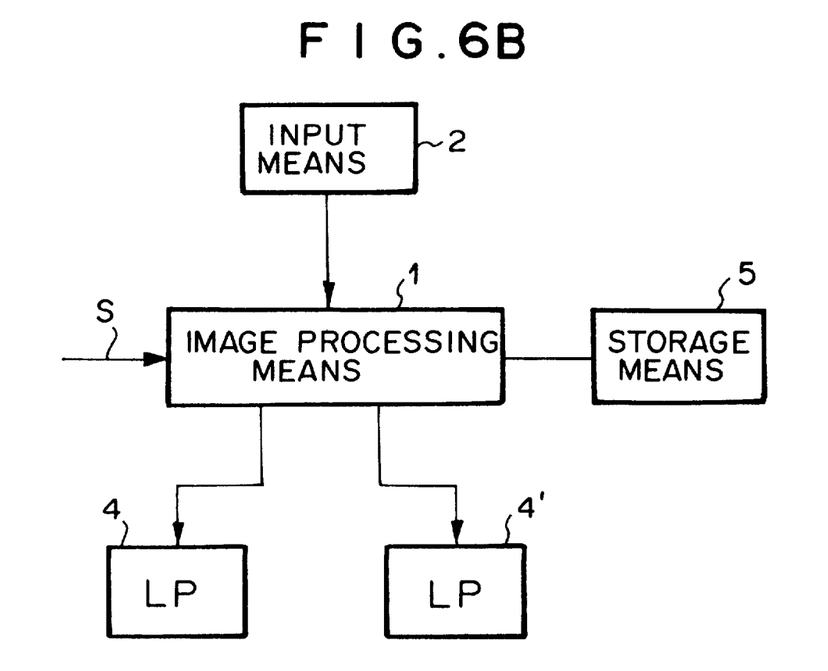
FIG. 6B is a block diagram showing an embodiment of the image reproducing apparatus in accordance with the present invention, wherein two image reproducing means are constituted of image recording means (laser printers).

Also, as illustrated in FIG. 6B, the LP 4 may be employed as an example of the first image reproducing means, and an LP 4' may be employed as an example of the second image reproducing means. In such cases, the first recorded image processing conditions, which yield a visible image having a desired level of gradation and/or a desired level of sharpness on the film with the LP 4, and the corresponding second recorded image processing conditions, which yield a visible image having a desired level of gradation and/or a desired level of sharpness on the film with the LP 4', may be set, and the information representing the conditions may be stored in the storage means 5. In such cases, the visible image having an appropriate level of gradation and/or an appropriate level of sharpness is reproduced on the film with the LP 4 and from the processed image signal, which has been obtained from the image processing carried out by the image processing means 1 under the first recorded image processing conditions. At this time, the image processing means 1 reads the information representing the second recorded image processing conditions, which correspond to the first recorded image processing conditions, from the storage means 5. The image processing means 1 carries out the image processing on the aforesaid image signal and under the second recorded image processing conditions. The visible image having an appropriate level of gradation and/or an appropriate level of sharpness is reproduced from the processed image signal having been obtained from the image processing carried out under the second recorded image processing conditions and is recorded on the film with the LP 4'.

What is claimed is:

1. An image reproducing method, wherein an image signal represents an image of an object, a first visible image is reproduced by a first image reproducing means and from a first processed image signal which has been obtained from image processing carried out on the image signal, and a second visible image is reproduced by a second image reproducing means and from a second processed image signal which has been obtained from image processing carried out on the image signal, the second image reproducing means having gradation characteristics in image reproduction which are different from gradation characteristics in image reproduction of the first image reproducing means, the method comprising the steps of:

i) preparing first reproduced image processing conditions which cause the first visible image to have a desired level of gradation when the first visible image is reproduced by the first image reproducing means, and corresponding second reproduced image processing conditions which cause the second visible image to have a desired level of gradation when the second visible image is reproduced by the second image reproducing means, ii) in the event the visible image is reproduced by the first image reproducing means in accordance with the first reproduced image processing conditions, carrying out image processing on the image signal under the second reproduced image processing conditions, which correspond to said first reproduced image processing conditions, so as to obtain said second processed image signals and iii) reproducing the second visible image by the second image reproducing means from said second processed image signal, wherein the first reproduced image processing conditions and the second reproduced image processing conditions are each prepared in accordance with a portion of the object to be imaged, the pattern of said portion being embedded in the image.

2. The method according to claim 1, wherein the first visible image and the second visible image are reproduced by respective video display monitors.

3. An image reproducing apparatus, comprising:

i) an image processing means for carrying out image processing on an image signal representing an image of an object, ii) a first image reproducing means for reproducing a first visible image from a first processed image signal which has been obtained from image processing carried out on the image signal, iii) a second image reproducing means for reproducing a second visible image from a second processed image signal which has been obtained from image processing carried out on the image signal, the second image reproducing means having gradation characteristics in image reproduction which are different from gradation characteristics in image reproduction of the first image reproducing means, and iv) a storage means for storing information representing first reproduced image processing conditions which cause the first visible image to have a desired level of gradation when the first visible image is reproduced by the first image reproducing means, and for storing information representing the corresponding second reproduced image processing conditions which cause the second visible image to have a desired level of gradation when the second visible image is reproduced by the second image reproducing means, wherein, in the event the first visible image is reproduced by the first image reproducing means in accordance with the first reproduced image processing conditions, the image processing means reads, from said storage means, the information representing the second reproduced image processing conditions and carries out image processing on the image signal under the second reproduced image processing conditions, wherein the first reproduced image processing conditions and the second reproduced image processing conditions are prepared in accordance with a portion of the object to be imaged, the pattern of the portion being embedded in the image, and the information representing the first and second reporduced image processing condition is then stored in said storage means.

4. The apparatus according to claim 3, wherein the first and second image reproducing means each comprise a video display monitors.

5. An image reproducing method, wherein an image signal represents an image of an object, a first visible image is reproduced by a first image reproducing means from a first processed image signal which has been obtained from image processing carried out on the image signal, and a second visible image is reproduced by a second image reproducing means from a second processed image signal which has been obtained from image processing carried out on the image signal, the second image reproducing means having sharpness characteristics in image reproduction which are different from sharpness characteristics in image reproduction of the first image reproducing means, the method comprising the steps of:

i) preparing first reproduced image processing conditions which cause the first visible image to have a desired level of sharpness when the first visible image is reproduced by the first image reproducing means, and corresponding second reproduced image processing conditions which cause the second visible image to have a desired level of sharpness when the second visible image is reproduced by the second image reproducing means, ii) in the event the visible image is reproduced by the first image reproducing means in accordance with the first reproduced image processing conditions, carrying out image processing on the image signal under the second reproduced image processing conditions so as to obtain said second a processed image signal, and iii) reproducing the second visible image by the second image reproducing means from said second processed image signal.

6. The method as defined in claim 5, wherein the first image reproducing means is an image displaying means for displaying the first visible image, and wherein the second image reproducing means is an image recording means for recording the second visible image on a recording material.

7. The method as defined in claim 5, wherein the first image reproducing means is an image displaying means for displaying the first visible image, and wherein the second image reproducing means is an image displaying means for displaying the second visible image.

8. The method as defined in claim 5, wherein the first image reproducing means is an image recording means for recording the first visible image on a recording material, and wherein the second image reproducing means is an image recording means for recording the second visible image on a recording material.

9. An image reproducing apparatus, comprising:
   i) an image processing means for carrying out image processing on an image signal representing an image of an object,
   ii) a first image reproducing means for reproducing a first visible image from a first processed image signal which has been obtained from image processing carried out on the image signal,
   iii) a second image reproducing means for reproducing a second visible image from a second processed image signal which has been obtained from image processing carried out on the image signal, the second image reproducing means having sharpness characteristics in image reproduction which are different from sharpness characteristics in image reproduction of the first image reproducing means, and
   iv) a storage means for storing information representing first reproduced image processing conditions which cause the first visible image to have a desired level of sharpness when the first visible image is reproduced by the first image reproducing means, and for storing information representing second reproduced image processing conditions which cause the second visible image to have a desired level of sharpness when the visible image is reproduced by the second image reproducing means,
      wherein, in the event the first visible image is reproduced by the first image reproducing means in accordance with the first reproduced image processing conditions, the image processing means reads, from said storage means, the information representing the second reproduced image processing conditions and carries out image processing on the image signal under the second reproduced image processing conditions.

10. An apparatus as defined in claim 9, wherein the first image reproducing means is an image displaying means for displaying the first visible image, and wherein the second image reproducing means is an image recording means for recording the second visible image on a recording material.

11. An apparatus as defined in claim 9, wherein the first image reproducing means is an image displaying means for displaying the first visible image, and wherein the second image reproducing means is an image displaying means for displaying the second visible image.

12. An apparatus as defined in claim 9, wherein the first image reproducing means is an image recording means for recording the first visible image on a recording material, and wherein the second image reproducing means is an image recording means for recording the second visible image on a recording material.

13. An image reproducing method, wherein an image signal represents an image of an object, a first visible image is reproduced by a first image reproducing means from a first processed image signal which has been obtained from image processing carried out on the image signal, and a second visible image is reproduced by a second image reproducing means from a second processed image signal which has been obtained from image processing carried out on the image signal, the second image reproducing means having gradation characteristics and sharpness characteristics in image reproduction which are different from gradation characteristics and sharpness characteristics in image reproduction of the first image reproducing means, the method comprising the steps of:
   i) preparing first reproduced image processing conditions which cause the first visible image to have a desired level of gradation and sharpness when the first visible image is reproduced by the first image reproducing means, and corresponding second reproduced image processing conditions which cause the second visible image to have a desired level of gradation and sharpness when the second visible image is reproduced by the second image reproducing means,
   ii) in the event the visible image is reproduced by the first image reproducing means in accordance with the first reproduced image processing conditions, carrying out image processing on the image signal under the second reproduced image processing conditions so as to obtain said second a processed image signal, and
   iii) reproducing the second visible image by the second image reproducing means from said second processed image signal.

14. The method as defined in claim 13, wherein the first image reproducing means is an image displaying means for displaying the first visible image, and wherein the second image reproducing means is an image recording means for recording the second visible image on a recording material.

15. The method as defined in claim 13, wherein the first image reproducing means is an image displaying means for displaying the first visible image, and wherein the second image reproducing means is an image displaying means for displaying the second visible image.

16. The method as defined in claim 13, wherein the first image reproducing means is an image recording means for recording the first visible image on a recording material, and wherein the second image reproducing means is an image recording means for recording the second visible image on a recording material.

17. An image reproducing apparatus, comprising:
   i) an image processing means for carrying out image processing on an image signal representing an image of an object,
   ii) a first image reproducing means for reproducing a first visible image from a first processed image signal which has been obtained from image processing carried out on the image signal,
   iii) a second image reproducing means for reproducing a second visible image from a second processed image signal which has been obtained from image processing carried out on the image signal, the second image reproducing means having gradation characteristics and sharpness characteristics in image reproduction which are different from gradation characteristics and sharpness characteristics in image reproduction of the first image reproducing means, and iv) a storage means for storing information representing first reproduced image processing conditions which cause the first visible image to have a desired level of gradation and sharpness when the first visible image is reproduced by the first image reproducing means, and for storing information representing second reproduced image processing conditions which cause the second visible image to have a desired level of gradation and sharpness when the visible image is reproduced by the second image reproducing means, wherein, in the event the first visible image is reproduced by the first image reproducing means in accordance with the first reproduced image processing conditions, the image processing means reads, from said storage means, the information representing the second reproduced image processing conditions and carries out image processing on the image signal under the second reproduced image processing conditions.

18. An apparatus as defined in claim 17, wherein the first image reproducing means is an image displaying means for displaying the first visible image, and wherein the second image reproducing means is an image recording means for recording the second visible image on a recording material.

19. An apparatus as defined in claim 17, wherein the first image reproducing means is an image displaying means for displaying the first visible image, and wherein the second image reproducing means is an image displaying means for displaying the second visible image.

20. An apparatus as defined in claim 17, wherein the first image reproducing means is an image recording means for recording the first visible image on a recording material, and wherein the second image reproducing means is an image recording means for recording the second visible image on a recording material.

* * * * *